Figure 1:
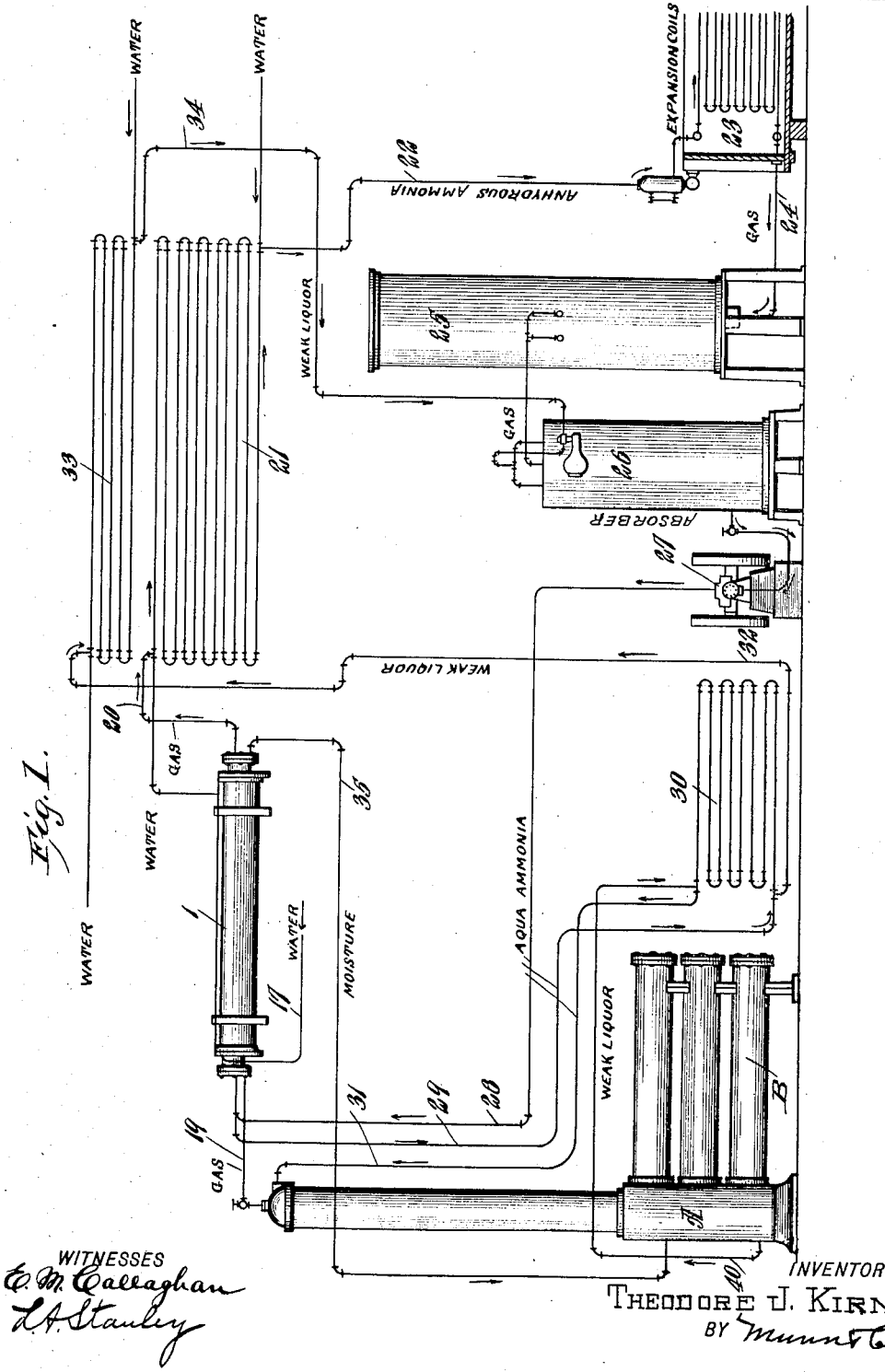

T. J. KIRN.
ABSORPTION REFRIGERATING MACHINE.
APPLICATION FILED AUG. 29, 1908.

925,920.

Patented June 22, 1909.
3 SHEETS—SHEET 1.

WITNESSES

INVENTOR
THEODORE J. KIRN
BY

ATTORNEYS

T. J. KIRN.
ABSORPTION REFRIGERATING MACHINE.
APPLICATION FILED AUG. 29, 1908.
925,920.
Patented June 22, 1909.
3 SHEETS—SHEET 2.
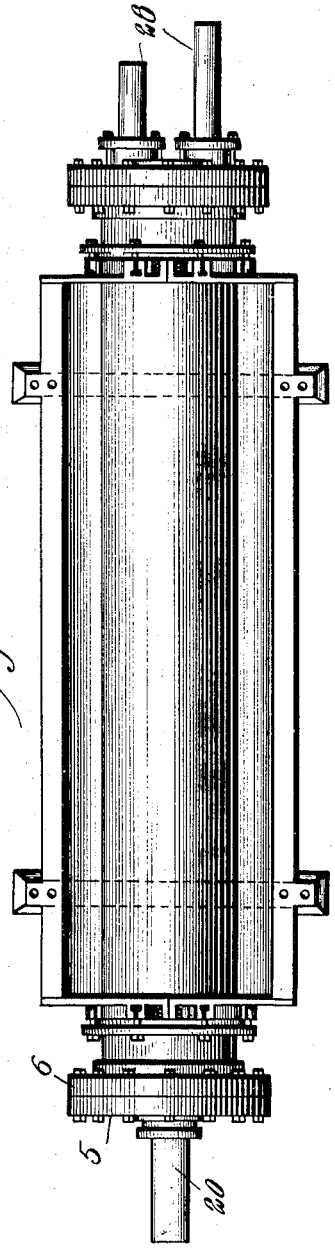
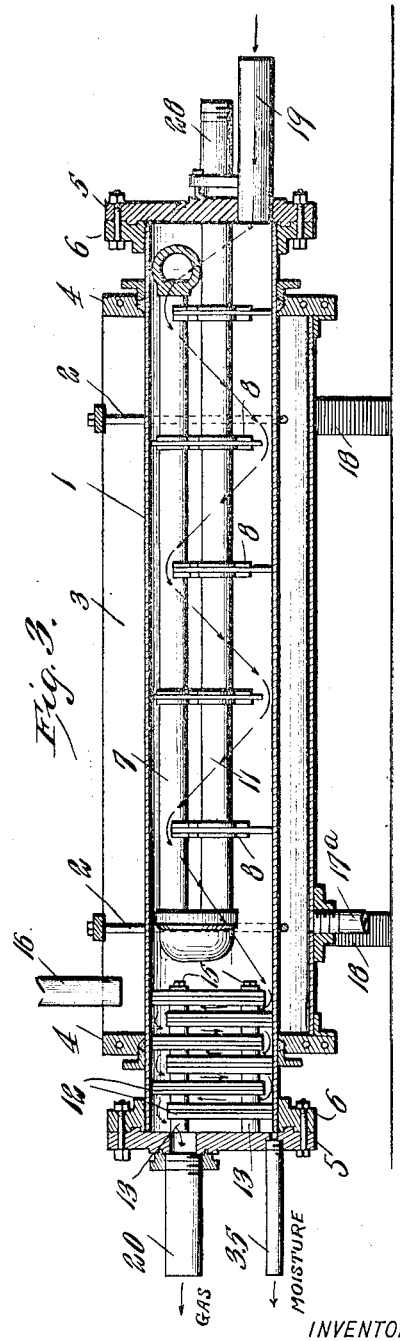
WITNESSES
INVENTOR
THEODORE J. KIRN
BY
ATTORNEYS T. J. KIRN.
ABSORPTION REFRIGERATING MACHINE.
APPLICATION FILED AUG. 29, 1908.
925,920.
Patented June 22, 1909.
3 SHEETS—SHEET 3.
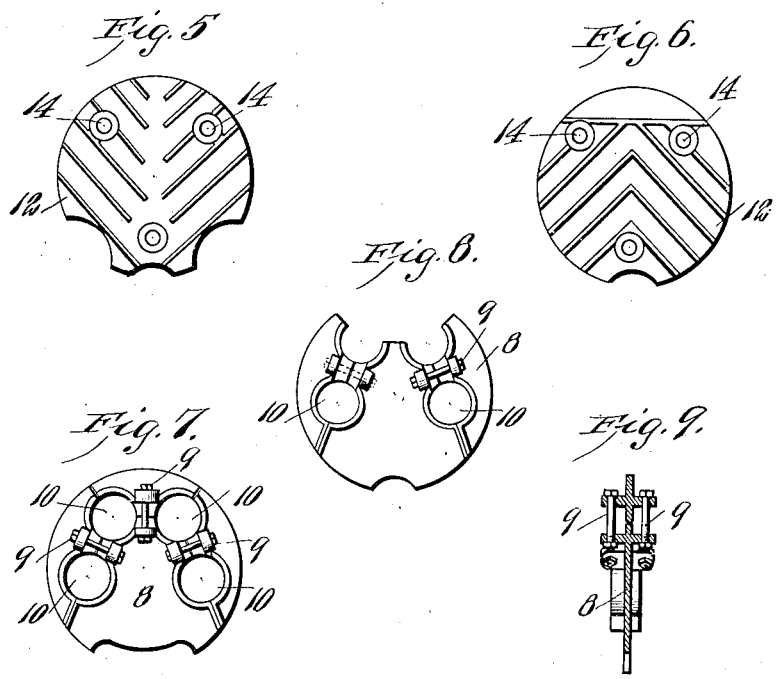
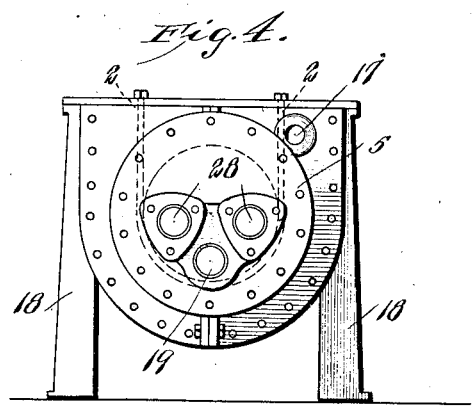
WITNESSES
E. W. Callaghan
L. A. Stanley
INVENTOR
THEODORE J. KIRN
BY Munn&Co.
ATTORNEYS

UNITED STATES PATENT OFFICE.

THEODORE J. KIRN, OF LOUISVILLE, KENTUCKY.

ABSORPTION REFRIGERATING-MACHINE.

No. 925,920.  Specification of Letters Patent.  Patented June 22, 1909.

Application filed August 29, 1908. Serial No. 450,799.

*To all whom it may concern:*

Be it known that I, THEODORE J. KIRN, a citizen of the United States, and a resident of Louisville, in the county of Jefferson and State of Kentucky, have made certain new and useful Improvements in Absorption Refrigerating-Machines, of which the following is a specification.

My invention relates to improvements in refrigerating machines, and more particularly to that class which is known as "absorption refrigerating machines", in which ammonia gas is separated by heat from aqua ammonia, condensed by pressure, and cooled into liquid condition. The subsequent change from the liquid form into the gaseous form abstracts heat and produces a lower temperature in the refrigerating coils, or in substances in the immediate vicinity of the cooling agent. Heretofore, the devices of this kind, in which the ammonia is derived by heating the aqua ammonia in a still or generator, difficulty has been encountered in obtaining the ammonia in the anhydrous form on account of the tendency for the steam, which is generated at the same time, to pass over with the ammonia, thereby diluting it and rendering it less efficient for cooling purposes.

An object of my invention is to provide a device which, while freeing the ammonia gas from the moisture contained therein and returning the latter to the generator, acts at the same time as an economizer of heat by preheating the aqua ammonia, before it is returned to the generator, so that the latter is raised to a considerable temperature and therefore does not require the same amount of heat to drive off its ammonia that it otherwise would.

Other objects and advantages will appear in the following specification and will be particularly pointed out in the annexed claims.

My invention is illustrated in the accompanying drawings, in which—

Figure 1 is a diagrammatic view of a refrigerating plant provided with my improved dehydrater. Fig. 2 is a plan view of the dehydrater. Fig. 3 is a sectional view of the dehydrater. Fig. 4 is an end view. Figs. 5 and 6 are detail side views of the ribbed plates. Figs. 7 and 8 are detail views of the baffles, and Fig. 9 is a sectional view of the baffle shown in Fig. 7.

Referring now to Figs. 2 and 3 I have shown therein a horizontal cylinder 1, suspended by means of the bands or straps 2 in the center of a casing 3, the latter constituting a water-jacket and being provided with water-tight heads 4 having openings at their ends to permit the passage of the horizontal cylinder 1. These heads are provided with suitable packing and are arranged to be securely fastened to the casing 3 so as to prevent any leakage. The horizontal cylinder 1 is also provided with heads 5, which are arranged to be bolted to the outwardly extending flanges 6 on the cylinder 1 to render the latter gas-tight. Extending through openings in the heads 5 are the pipes 7. These pipes consist merely of four cylindrical members joined to form one continuous coil. The manner in which this coil is supported within the cylinder 1 may be seen by reference to Fig. 3 in connection with Figs. 7 and 8. This is accomplished by means of a series of plates 8, extending transversely of the cylinder 1 and constituting a series of baffles as well as supporting and spacing members. These baffles are made in sections as clearly shown in Figs. 7 and 8, which can be bolted together by means of the bolts 9. One series of plates is designed to extend upwardly from the bottom of the cylinder, while the other series projects downwardly from the top of the cylinder. The baffle plates 8 are provided with openings 10, through which the pipes of the coil 11 are adapted to pass. In assembling these parts the sections of the baffles are bolted around the pipes in the manner clearly understood by reference to Figs. 7 and 8. The downwardly extending baffle plate is shown in Fig. 7, while the upwardly extending plate is shown in Fig. 8. At one end of the cylinder 1 there is arranged a series of ribbed plates 12, which also form a series of baffles. These plates are closer together than the baffles heretofore mentioned and are provided with a series of ribs designed to form obstructing surfaces to the passage of water, thereby affording an efficient heat extractor. These plates are clamped together by means of the binding rods 13, which pass through openings 14 at the upper and lower edges of the plates, and are held by nuts 15 on their ends. A pipe 16 enters the top of the open water-jacket 3, while the pipe 17 furnishes an overflow exit for the water. In order to support the cylinder and the surrounding water-jacket, I have provided the legs or supports 18 at each end of the cylinder, as shown in the drawing. On the bottom of the casing at one end thereof is a wash-out pipe 17ª.

The use of my dehydrating device may be clearly seen from an inspection of Fig. 1. In this figure I have shown a diagrammatic view of the general arrangement of a refrigerating plant. The generator or still is shown at A. Here the aqua ammonia is subjected to the heat of the steam coils B, and the gas is driven up to the top of the generator and passes by means of the pipe 19 into one end of the cylinder 1. The course that the gas takes through this cylinder is indicated in Fig. 3 by the arrows. It will be seen that owing to the baffles 8, this is a zigzag path, the gas being forced over and around the pipes 7 in an effort to reach the other end of the cylinder. The pipes 7, as will be shown hereinafter, are supplied with cold aqua ammonia and the contact of the hot gas with the moisture therein causes a precipitation of the latter and a heating of the aqua ammonia in the pipes. The gas now passes the baffles 12 at the end of the cylinder 1, and since these baffles have large radiating surafces, the gas is still further cooled, the moisture therein condensing on the plates and running to the bottom of the cylinder and out through the pipe 35. The gas is now 99% pure. The gas in the meantime is forced through the exit pipe 20 into the condenser 21, where it is condensed to a liquid form, by the cooling action of a stream of water. From thence the anhydrous ammonia in liquid form flows down by means of the pipes 22 to the expansion coils 23, where it may be used for cooling these coils, or for any other purpose, such as making ice. The cooling effect is accomplished by the change of the liquid to a gaseous form, the gas then passing by means of the pipe 24 to the water cooler 25, and thence into the absorber 26.
From here it is forced by means of the pump 27 through the pipe 28 into the coil 7 in the cylinder 1, where its cooling action tends to condense the moisture in the gas as already described. Returning through the pipe 29, the aqua ammonia passes through the inner pipes of the exchanger 30, which is of double pipe construction, and from thence it is forced through the pipe 31 into the generator, thus having completed the cycle. The aqua ammonia pumped into the generator is 26 Baumé. After the gas has been separated in the first operation of heating the aqua ammonia in the generator, the weak liquor left is 19 Baumé. This weak liquor is allowed to leave the generator A and to pass through the pipe 40, through the outer pipes of the exchanger 30 and thence by means of the pipe 32, which connects therewith, to the weak liquor cooler 33. Passing then through the pipe 34 into the absorber 26 it again takes up or absorbs the gas coming from the cooler 25.

It will thus be seen that I have provided a device which dehydrates the ammonia gas, and in the very operation of so doing, heats the aqua ammonia which is to be again used for producing the ammonia gas. Moreover, since the gas has been cooled by imparting its heat to the aqua ammonia, it does not require the same amount of cooling in the condenser that it otherwise would, thus effecting a saving of water in the condenser. A still further saving is effected because of the pure condition of the dehydrated gas, which is far more efficient for having the moisture removed from it than for being in an impure state.

I claim—

1. In an absorption refrigerating machine, an ammonia gas generator, a dehydrating apparatus communicating therewith, comprising an outer water-jacket, a gas cooling cylinder disposed therein, a cooling coil arranged within said cylinder, baffle plates within said cylinder for deflecting the gas from said generator, a condenser, an expansion coil, an absorber, means for forcing cooled aqua ammonia through said cooling coil, and means thereafter for returning said aqua ammonia to the generator.
2. In an absorption refrigerating machine, an ammonia gas generator, a dehydrating apparatus communicating therewith, comprising an outer water-jacket, a gas cooling cylinder disposed therein, a cooling coil arranged within said cylinder, baffle plates within said cylinder for deflecting the gas from said generator against the walls of said cooling pipe, a condenser, an expansion coil, means for producing aqua ammonia from the gas coming from said expansion coil, means for forcing said aqua ammonia through said cooling coil, means for thereafter returning said aqua ammonia to said generator, and means for returning the condensed moisture of the gas cooling cylinder to said generator.

3. In an absorption refrigerating machine, a horizontally arranged water-jacket having inlet and outlet pipes, a cylinder suspended within said water-jacket centrally of the same, a cooling coil arranged within said cylinder longitudinally thereof, a series of baffle plates projecting upwardly from the bottom of said cylinder, a second series of baffle plates projecting downwardly from the top of said cylinder and arranged to alternate with the first-mentioned baffle plates, said baffle plates constituting deflecting and supporting members, a group of ribbed deflecting plates in one end of said cylinder, said plates being arranged in close relation with each other, an inlet pipe for gas at one end of said cylinder, an outlet pipe for gas at the other end of said cylinder, and an exit pipe for moisture arranged near said ribbed plates.

4. In an absorption refrigerating machine, an external water-jacket, a cylinder disposed therein, a series of baffle plates arranged transversely of said cylinder, a cooling coil disposed longitudinally within said cylinder and having pipes arranged to pass through and to be supported by said baffle plates, a group of ribbed baffle plates in close relation with each other, heads for said cylinder, means for rendering said heads gas and water-tight, means for passing gas into and from said cylinder, and means for withdrawing condensed moisture from said cylinder.

5. In an absorption refrigerating machine, an external water-jacket, a cooling cylinder arranged therein, a series of baffles extending transversely of said cooling cylinder, a cooling coil supported by said baffles, a group of ribbed baffles constituting an auxiliary cooling apparatus, the individual baffles of the group being arranged in close proximity with the ribs extending across the path of travel of the gas, means for passing gas into and out of said cylinder, and means for withdrawing the condensed moisture therefrom.

6. In an absorption refrigerating machine, a water-jacket, a gas cooling cylinder arranged therein, a cooling coil disposed within said cooling cylinder, a series of baffles within said cylinder for deflecting the gas back and forth transversely of said cooling coil and into contact with the sides thereof, and a group of auxiliary ribbed cooling plates, said plates being arranged closer together to provide a tortuous passage for the gas, and the ribs thereof constituting a heat absorbing medium, means for passing gas into and out of said cooling cylinder, and means for withdrawing moisture from said cylinder.

7. In an absorption refrigerating machine, a water-jacket, a gas cooling cylinder therein, a cooling coil within said cylinder, means for supplying said cooling coil with aqua ammonia, and a series of baffle plates arranged to deflect the gas against said cooling coil.

THEODORE J. KIRN.

Witnesses:
   J. C. SWARTZ,
   J. A. MAYER.